United States Patent Office 2,822,274
Patented Feb. 4, 1958

2,822,274
PROCESS FOR THE PREPARATION OF SQUID FILLETS

Beverly E. Williams, Hillsborough, Calif.

No Drawing. Application September 25, 1957
Serial No. 686,050

3 Claims. (Cl. 99—111)

This invention relates to the processing of food products, and has particular reference to a process for the preparation of squid for human consumption.

The Spanish term "calamar" is applied to the mollusk *Loligo opalescence,* known also as the squid. Various mutations of Loligo are found all over the world, particularly in the Mediterranean, in Japan, and on our East and West Coasts.

Squid is considered a great delicacy among Latins, Orientals, and a few Americans. But to most Americans, this delicacy is virtually unknown because the Latin and Oriental methods of preparing it are not to the average American's taste.

The body of the squid is long and tapered, with a cartilaginous "quill" for a back bone, with a caudal fin on each side at the pointed end, and a head surmounted by ten tentacles, protruding from the open end. The body is called the "mantle" and is covered by a dark, mottled membrane that is easily removed with the caudal fins.

Squid is prepared as a food by the Latins and Orientals usually cut in pieces in stews or soups, or the mantle is eviscerated, the quill withdrawn, and the skin removed to produce a clean, white "fillet" that is fried, stuffed or otherwise prepared for the table. Squid remains tough or rubbery, although well flavored no matter how cooked. But most important, however this prepared mantle or fillet may be cooked, it will always curl and shrink, and cannot be served as a fillet as can other fish.

One of the principal objects of this invention is, therefore, to provide a process for the preparation of squid fillets for human consumption to render them tender and capable of being cooked without change of the fillet shape of the product.

Another object of this invention is to provide a novel process for the preparation of squid fillets which is simple and adapted to be carried out economically in the preparation of products for human consumption on a quantity basis.

Other objects and advantages of this invention will be readily apparent from the following detailed description of illustrative embodiments thereof.

Briefly, this invention comprises the discovery that the squid mantle can be simultaneously tenderized and rendered non-curling upon cooking, by mechanical treatment of the mantle. The mantle is composed of an outer covering of a multitude of ligaments, filature fine, overlaying the meat portion of the mantle. Upon heating of the mantle, as in cooking, the individual ligaments contract, causing the mantle to curl and shrink. I have discovered that if each of the ligaments are cut at regular intervals, as by scoring the surface, the contracting of the individual segments upon heating will influence only the immediate area surrounding each segment, if at all, and will not be added to that of the other segments to result in a cumulative contraction sufficient to result in the objectionable curling and shrinkage. I have also found that by so cutting the ligaments, the meat when cooked is tender without being soft. Another unexpected result is that the meat so treated releases its flavor more readily upon cooking and swells to produce a fillet of increased thickness.

In carrying out the process of this invention, the squid are cleaned and skinned, leaving the side walls or mantles clean and trimmed to fillet shape and size (such as rough rectangles approximately 4 x 5 inches in size). The flat mantles are then subjected to the cutting or scoring treatment referred to above to prevent curling when subjected to heat as in cooking. That is, one system of ligaments covering the flesh of the mantle is segmented by a plurality of spaced cuts extending in at least two mutually perpendicular directions in such a manner that substantially all of the ligaments are repeatedly severed into lengths of roughly ⅛ to ½ inch each. A conventional seasoning or batter and breading is then applied to the surfaces of the scored fillets, in accordance with conventional practice in the preparation of other fish products. The fillets are preferably frozen and packaged for sale in the frozen state.

The application of the batter and breading is not essential, but enhances the flavor, adds body, and increases the eye-appeal of the food product. The fillets may be either quick or slow frozen, in accordance with conventional frozen food processing techniques.

The fillets so prepared keep very well, have an excellent appearance both before and after cooking, and they cook quickly without any trace of "fishy" smell. Although they may be prepared for the table in many ways, one of the most convenient cooking methods is to immerse the fillets in deep fat at about 350° F. for about a minute and a half. On a skillet with a film of fat or oil, they cook in about two minutes on a side, given what is called a "browning" heat. The delicacy of the flavor is lost if the fillets are overcooked.

Having fully described my invention, it is to be understood that I do not wish to be limited to the details set forth, but my invention is of the full scope of the appended claims.

What is claimed is:

1. In a process for preparing squid fillets for human consumption which are substantially non-curling upon heating and cooking, the steps of cleaning and skinning the mantle of the squid, trimming the cleaned and skinned mantle to fillet shape, and then cutting and scoring the ligaments covering the flesh of the mantle by a plurality of spaced cuts extending in at least two mutually perpendicular directions so that substantially all of the ligaments are repeatedly severed into lengths of approximately ⅛ to ½ inch each.

2. A process as described in claim 1 including the steps of seasoning and breading the scored fillet and then freezing the breaded fillet.

3. In a process for preparing squid fillets for human consumption which are substantially non-curling upon heating and cooking, the step of cutting and scoring the ligaments covering the flesh of the cleaned and skinned mantle of the squid by a plurality of spaced cuts extending in at least two mutually perpendicular directions so that substantially all of the ligaments are repeatedly severed into lengths of approximately ⅛ to ½ inch each.

References Cited in the file of this patent

UNITED STATES PATENTS

| Number | Name | Date |
|---|---|---|
| 274,438 | Bushfield | Mar. 20, 1883 |
| 678,514 | Regnier | July 16, 1901 |
| 1,026,918 | Kitchen | May 21, 1912 |
| 2,705,203 | Heidrich et al. | Mar. 29, 1955 |
| 2,752,629 | Shadid | July 3, 1956 |

(Other references on following page)

OTHER REFERENCES

"The Encyclopedia of Food," 1923, by A Ward, published by A. Ward, 50 Union Square, New York, page 489, article entitled "Squid."

"How To Cook And Eat In Chinese," 1949, by Buwei Yong Choa, published by Doubleday & Company, Inc., Garden City, New York, page 55, Recipe No. 1.10.

"The Art of Fish Cookery," 1949, by Milo Miloradovich, published by Doubleday & Company, Inc., Garden City, New York, pages 140 and 141, article entitled "Squid."